US007532180B2

(12) United States Patent
Yui et al.

(10) Patent No.: US 7,532,180 B2
(45) Date of Patent: May 12, 2009

(54) IMAGE DISPLAY APPARATUS

(75) Inventors: Hideaki Yui, Kawasaki (JP); Akira Hayama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/736,182

(22) Filed: Apr. 17, 2007

(65) Prior Publication Data

US 2007/0188526 A1 Aug. 16, 2007

Related U.S. Application Data

(62) Division of application No. 11/156,447, filed on Jun. 21, 2005, now Pat. No. 7,230,386.

(30) Foreign Application Priority Data

Jun. 29, 2004 (JP) ............................ 2004-191825
Jun. 7, 2005 (JP) ............................ 2005-166897

(51) Int. Cl.
*G09G 3/20* (2006.01)
*G01G 3/10* (2006.01)
*H01J 1/52* (2006.01)

(52) U.S. Cl. ........................ 345/75.2; 345/690; 345/55; 315/85

(58) Field of Classification Search ................... 315/85, 315/169.2, 169.4
See application file for complete search history.

(56) References Cited

U.S. PATENT DOCUMENTS 5,734,361 A 3/1998 Suzuki et al. ................. 345/74
6,307,327 B1 10/2001 Xie et al. ................. 315/169.4
6,489,938 B1 12/2002 Ito .............................. 345/63
6,580,407 B1 6/2003 Suzuki et al. .............. 345/74.1
6,603,450 B1 8/2003 Yamazaki et al. .......... 345/75.2
6,712,660 B2 3/2004 Aoki et al. ..................... 445/3
6,842,160 B2 1/2005 Yamazaki et al. ............. 345/76
6,888,519 B2 5/2005 Yamano et al. ............ 345/75.2

(Continued)

FOREIGN PATENT DOCUMENTS

JP 11-24629 1/1999

(Continued)

*Primary Examiner*—Trinh V Dinh
(74) *Attorney, Agent, or Firm*—Fitzpatrick, Cella, Harper & Scinto

(57) ABSTRACT

An image display apparatus includes a display panel having a plurality of electron emission portions that emit electrons, a plurality of light emitting regions positioned corresponding to the plurality of electron emission portions to emit light in response to irradiation of electrons from the electron emission portion thereon, and a shielding member provided between a substrate having the electron emission portions provided thereon and an opposing substrate having the light emitting regions thereon, and a correction circuit that corrects a pixel signal for modulating the electron emission portions. The shielding member shields electrons reflected from peripheral light emitting regions adjacent to a predetermined one of the light emitting regions to the predetermined light emitting region, and irradiates electrons from the shielding member to the predetermined light emitting region. The correction circuit carries out correction of the pixel signal with a correction value corresponding to the amount of electrons shielded by the shielding member among electrons to be irradiated to the light emitting region and correction with a correction value in which the amount of electrons irradiated from the shielding member to the light emitting region.

1 Claim, 17 Drawing Sheets

U.S. PATENT DOCUMENTS

| | | | | |
|---|---|---|---|---|
| 6,890,229 | B2 | 5/2005 | Aoki et al. | 445/3 |
| 7,046,219 | B2 | 5/2006 | Kanai et al. | 345/75.2 |
| 2002/0047574 | A1 * | 4/2002 | Kojima et al. | 315/169.3 |
| 2002/0167503 | A1 | 11/2002 | Tsunoda et al. | 345/204 |
| 2003/0107542 | A1 | 6/2003 | Abe et al. | 345/89 |
| 2004/0257311 | A1 | 12/2004 | Kanai et al. | 345/75.2 |
| 2005/0030263 | A1 | 2/2005 | Yamazaki | 345/75.1 |
| 2005/0057580 | A1 | 3/2005 | Yamano et al. | 345/690 |
| 2005/0105001 | A1 | 5/2005 | Yui et al. | 348/441 |
| 2005/0114901 | A1 | 5/2005 | Yui et al. | 725/100 |
| 2005/0125819 | A1 | 6/2005 | Ono et al. | 725/14 |
| 2005/0206958 | A1 | 9/2005 | Inamura | 358/3.23 |
| 2005/0286062 | A1 | 12/2005 | Yui | 358/1.9 |
| 2006/0132394 | A1 | 6/2006 | Hayama et al. | 345/74.1 |

FOREIGN PATENT DOCUMENTS

| | | |
|---|---|---|
| JP | 11-250839 | 9/1999 |
| JP | 11-250840 | 9/1999 |
| JP | 2000-250463 | 9/2000 |
| JP | 2001-13482 | 1/2001 |
| JP | 2003-29697 | 1/2003 |

* cited by examiner

DISPLAY BEFORE CORRECTION

DISPLAY AFTER CORRECTION

DISPLAY BEFORE CORRECTION

DISPLAY AFTER CORRECTION

IMAGE DISPLAY APPARATUS

This application is a division of application Ser. No. 11/156,447 filed Jun. 21, 2005, now U.S. Pat. No. 7,230,386.

BACKGROUND OF THE INVENTION

1. Field of the Invention

The present invention relates to an image display apparatus having a correction circuit that corrects a driving signal.

2. Description of the Related Art

U.S. Pat. No. 6,307,327 assigned to Motorola, Inc. entitled "Method for Controlling Spacer Visibility" discloses a method of controlling the visibility of a spacer in an field emission display, according to which a first region adjacent to a spacer, and a second region not adjacent to the spacer are defined, pixel data to be transmitted to the first region is modified based on the intensity of light generated by a plurality of pixels in the first region adjacent to the spacer in order to render the spacer invisible to a viewer.

SUMMARY OF THE INVENTION

The inventors have studied about how light emission is affected when electrons or ultraviolet light that provides energy to a light emitting material is shielded by a shielding member. It is an object of the present invention to provide a structure capable of appropriately correcting the effect.

In order to achieve the above described object, an image display apparatus according to the invention includes a display panel having a plurality of electron emission portions that emit electrons, a plurality of light emitting regions positioned corresponding to the plurality of electron emission portions to emit light in response to irradiation of electrons from the electron emission portion thereon, and a shielding member provided between a substrate having the electron emission portions provided thereon and an opposing substrate having the light emitting regions thereon, and a correction circuit that corrects a pixel signal for modulating the electron emission portions. The shielding member shields electrons reflected from peripheral light emitting regions positioned adjacent to a predetermined one of the light emitting regions to the predetermined light emitting region, and irradiates electrons from the shielding member to the predetermined light emitting region. The correction circuit corrects the pixel signal with a correction value corresponding to the amount of electrons shielded by the shielding member among electrons to be irradiated to the light emitting region and the amount of electrons irradiated from the shielding member to the light emitting region.

An image display apparatus according to the invention includes a display panel having a plurality of electron emission portions that emit electrons, a plurality of light emitting regions positioned corresponding to the plurality of electron emission portions to emit light in response to irradiation of electrons from the electron emission portion thereon, and a shielding member provided between a substrate having the electron emission portions provided thereon and an opposing substrate having the light emitting regions thereon, and a correction circuit that corrects a pixel signal for modulating the electron emission portions. The shielding member shields electrons reflected from peripheral light emitting regions adjacent to a predetermined one of the light emitting regions to the predetermined light emitting region, and irradiates electrons from the shielding member to the predetermined light emitting region. The correction circuit carries out a first correction with a correction value corresponding to the amount of electrons shielded by the shielding member among electrons to be irradiated to the light emitting region and a second correction with a correction value corresponding to the amount of electrons irradiated from the shielding member to the light emitting region. The correction circuit carries out one of said first correction and said second correction to the pixel signal and the other of said correction to the corrected pixel signal corrected by said one of said first correction and said second correction.

An image display apparatus according to the invention includes a display panel having a plurality of light emitting regions, an excitation portion that excites the light emitting regions, and a shielding member provided between a substrate having the excitation portion provided thereon and an opposing substrate having the light emitting regions provided thereon, and a correction circuit that corrects a pixel signal for modulating the excitation portion. The shielding member shields excitation energy reflected from peripheral light emitting regions positioned adjacent to a predetermined one of the light emitting regions to the predetermined light emitting region, and irradiates excitation energy to the predetermined light emitting region from the shielding member. The correction circuit corrects the pixel signal with a correction value that incorporates the amount of excitation energy shielded by the shielding member in excitation energy to be irradiated to the light emitting region and the amount of excitation energy irradiated from the shielding member to the light emitting region.

In the image display apparatus according to the invention, appropriate correction can be carried out.

DETAILED DESCRIPTION OF THE PREFERRED EMBODIMENTS

Now, embodiments of the invention will be described in detail by way of illustration. Note however that the sizes, materials, and shapes of components, and their relative positions according to the described embodiments should not be taken to limit the scope of the invention unless otherwise specified.

Embodiment of Television Set

Figure 17:
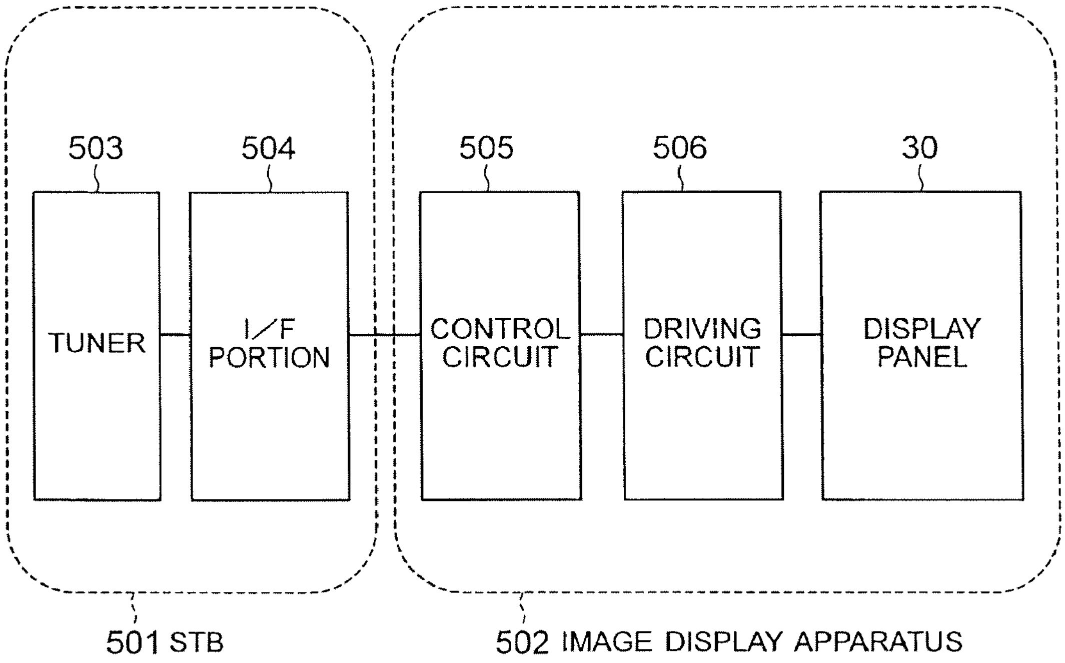
FIG. 17 is a block diagram of a television set according to the invention.

Now, a television set to which the invention is applied will be described with reference to FIG. 17. FIG. 17 is a block diagram of the television set according to the invention. The television set includes a set top box (STB) 501 and an image display apparatus 502. The set top box (STB) 501 has a tuner 503 and an I/F portion 504. The tuner 503 receives television signals such as satellite and ground wave broadcasting or data broadcasting through a network and outputs decoded image data to the I/F portion 504. The I/F portion 504 converts the image data into a display format for the image display apparatus 502 for output to the image display apparatus 502.

Figure 4:
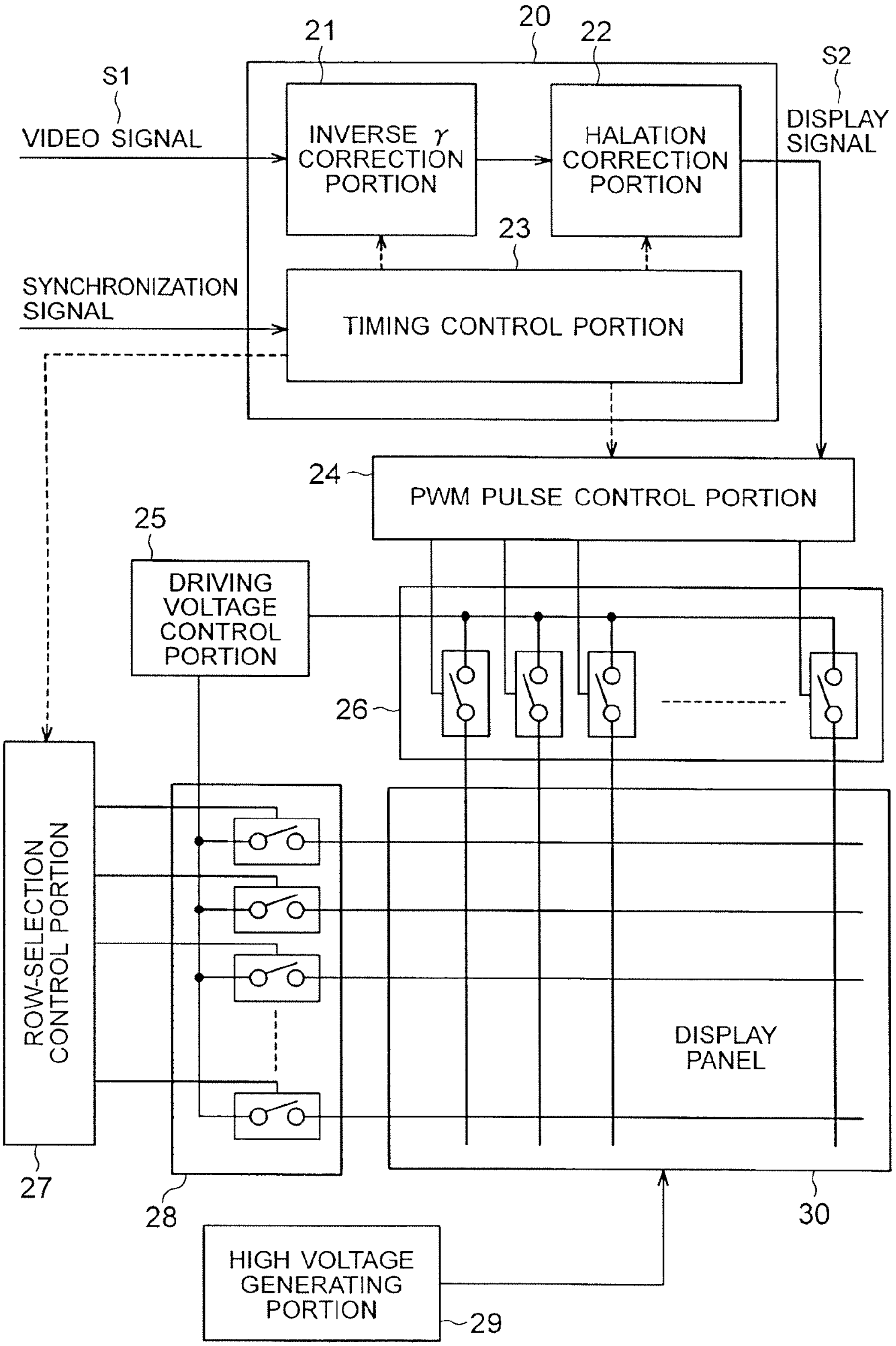
FIG. 4 is a block diagram of an image display device according to the invention.

The image display apparatus 502 has a display panel 30, a control circuit 505, a driving circuit 506, and a correction circuit (signal processing portion) according to the invention. The I/F portion 504 converts image data into a video signal as a pixel signal and a synchronization signal, and the signals are input to the correction circuit. More specifically, the signal processing portion 20 in FIG. 4 is connected to the I/F portion 504 in FIG. 17, and the video signal and the synchronizing signal produced by the conversion are input from the I/F portion 504 to the signal processing portion 20 in FIG. 4.

The control circuit 505 included in the image display apparatus 502 outputs a display signal produced by processing the video signal and various control signals to the driving circuit 506. The control circuit 505 may be for example a PWM pulse control portion 24, a driving voltage control portion 25, or a row selection control portion 27 shown in FIG. 4. The driving circuit 506 outputs a driving signal to the display panel 30 based on the input display signal and television video is displayed on the display panel 30. The driving circuit 506 may be for example a column interconnection switch portion 26 or a row interconnection switch portion 28 in FIG. 4. The display panel 30 may be for example an SED panel according to the following embodiment.

Note that the tuner 503 and the I/F portion 504 may be stored in a separate case from the image display apparatus 502 as the set top box (STB) 501, or stored in the same case as the image display apparatus 502.

First Embodiment

A first embodiment of the invention will be described. The image display apparatus according to the invention includes an SED display, an FED display, and a plasma display. In an electron beam display device such as the SED display and the FED display, halation emission may be caused at peripheral pixels based on the luminance of a luminescent spot that emits light by itself, and therefore the invention is most preferably applied. In a plasma display having barriers provided between discharge cells and a plurality of pixels provided between the barriers, there could be halation (cross talk) among peripheral pixels, and the invention is preferably applicable to such a device. In this case, in the electron beam display, electrons correspond to the energy to be discharged, while in the plasma display, ultraviolet light corresponds to the energy to be discharged.

The configuration of the image display apparatus according to the embodiment will be described in conjunction with FIG. 4. The reference numeral 30 represents a display panel. According to the embodiment, an SED panel is used. The SED panel includes, in a thin vacuum container, a multi-electron source having a lot of electron emission elements such as cold cathode elements arranged on a substrate, and an image forming material (fluorescent material) that forms an image in response to electron irradiation. The electron source and the material are provided opposing each other. The electron emission elements are interconnected in a simple matrix of row interconnection electrodes and column interconnection electrodes, electrons emitted from an element selected by column/row electrode biasing are accelerated by high voltage and impinged on the fluorescent material to cause light emission. Japanese Patent Laid-Open No. 2000-250463 discloses in detail the structure and manufacturing method of the SED panel.

The operation from providing the SED panel with a video signal as an input to displaying an image will be described. A signal S1 is an input video signal and subjected to signal processing suitable for display at the signal processing portion 20, and as a result, a signal S2 is output as a display signal.

In FIG. 4, only the minimum necessary functional blocks for describing the embodiment are shown regarding the function of the signal processing portion 20.

The reference numeral 21 represents an inverse γ correction portion. In general, the input video signal S1 is subjected to non-liner conversion with a power of 0.45 such as gamma correction based on the input-emission characteristic of the CRT display so that the signal is displayed at the CRT display, and the resulting signal is transmitted or recorded. When the video signal is displayed at a display having an linear input-emission characteristic such as an SED, an FED and a PDP, the input signal must be subjected to inverse γ correction with a power of 2.2. The output data from the inverse γ correction portion 21 is converted into data system linear to the luminance of the display panel, and the data is input to the halation correction portion 22, which is a characteristic of the embodiment.

The halation correction portion 22 will later be described in detail. The output from the halation correction portion 22 is output as the display signal S2 for optimum video for the SED. The timing control portion 23 produces and outputs various timing signals for the operation of the blocks based on the synchronization signal transmitted and received together with the input video signal S1.

A PWM pulse control portion 24 converts the display signal S2 into a driving signal adapted to the display panel 30

(such as PWM modulation) for each horizontal cycle (row selecting period). A driving voltage control portion 25 controls voltage used to drive elements provided in the display panel 30. The column interconnection switch portion 26 includes switch means such as a transistor, and allows the driving output from the driving control portion 25 to be applied to the panel column electrode only during a PWM pulse period, the output period of the PWM pulse control portion 24 for each horizontal cycle (row selection period). The row selection control portion 27 generates a row selecting pulse to drive elements on the display panel 30. The row interconnection switch portion 28 includes switch means such as a transistor and outputs the driving output of a driving voltage control portion 35 in response to the row selecting pulse output from the row selection control portion 27 to the display panel 30. A high voltage generating portion 29 generates accelerating voltage used to accelerate electrons emitted from the electron emission elements provided in the display panel 30 and causes the electrons to be impinged upon the fluorescent material that is not shown. In this way, the display panel 30 is driven and video is displayed.

Now, the halation correction portion 22, a characteristic part of the invention will be described in conjunction with the drawings.

Figure 1:
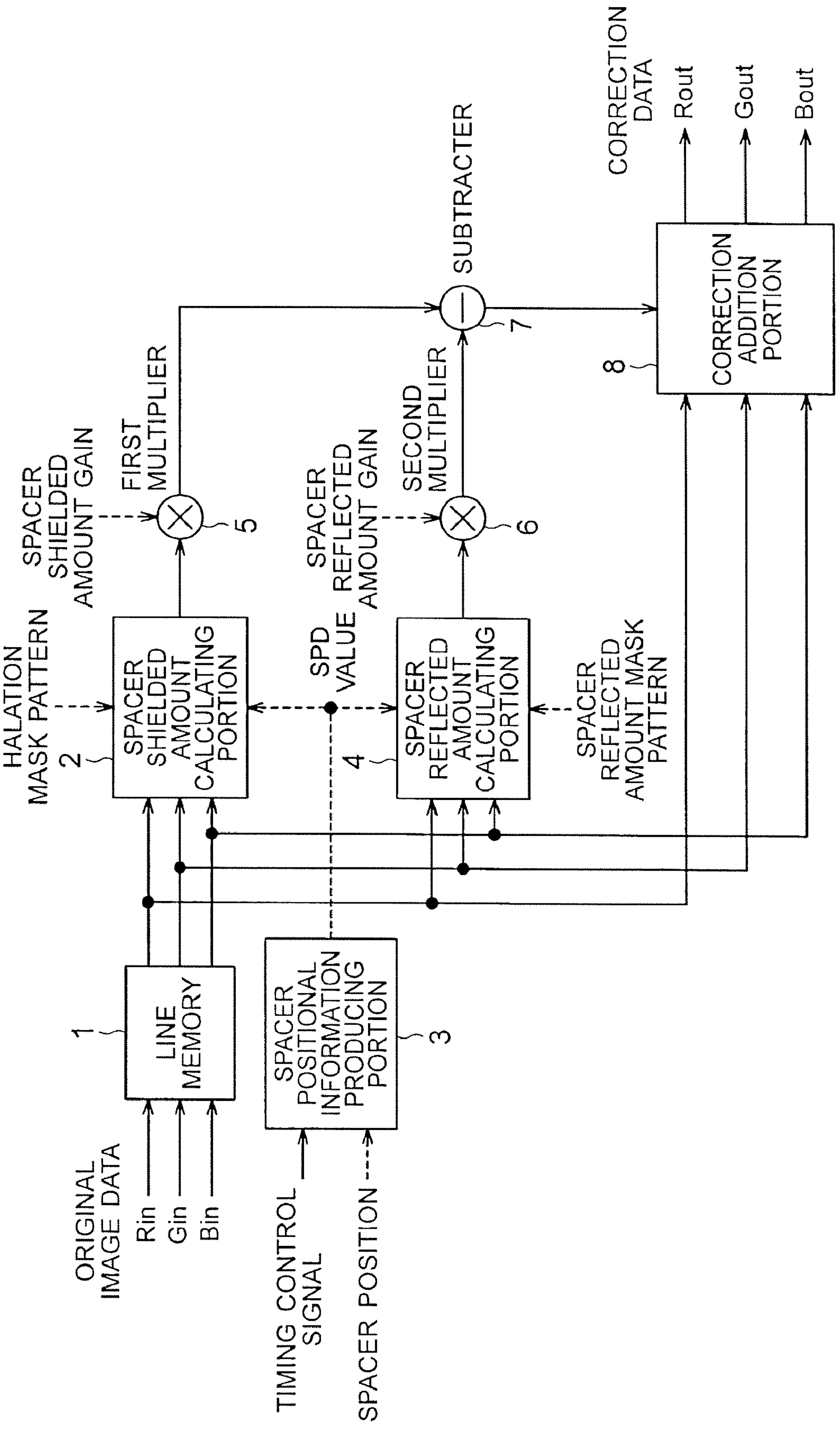
FIG. 1 is a block diagram of a halation correction portion according to a shielded amount addition method according to a first embodiment of the invention.

Now, the "halation" will be defined before further description is provided in connection with FIG. 1. As shown in FIG. 5A, the inventors have found that color reproducibility is different from a desired level in an image display apparatus that uses electron emission elements formed at a rear plate and light emitting materials (fluorescent materials for red, blue, and green in this example) provided in a face plate apart from the electron emission elements, and irradiates an electron beams (primary electrons) emitted from the electron emission elements on the light emitting materials to cause the materials to emit light. This was a unique problem regarding the device.

In a specific example, it has been found that when electrons are directed only upon a blue fluorescent material to obtain blue light emission, light is slightly different from pure blue light, in other words, the other colors, green and red are slightly mixed into the emitted light. In other words, a light emitting state with lower chroma is attained. After considerable study and research efforts, the inventors have found that when electrons emitted by the electron emission element (referred to as "primary electrons" herein) come into a light emitting material corresponding to the electron emission element, and the corresponding light emitting material generates a luminescent spot (emits light), electrons produced or present (including electrons resulting from the primary electrons reflected by the light emitting material or secondary electrons generated as the primary electrons come into the light emitting material, which are collectively referred to as secondary electrons or reflected electrons in this application) because of the entrance of the primary electrons into the light emitting material come into a adjacent light emitting region (including a immediately adjacent region) in a different color, so that the adjacent light emitting material emits light. It has been confirmed that this causes the chroma to be reduced. The light emission by the secondary electrons is referred to "halation" according to the invention.

Figure 5B:
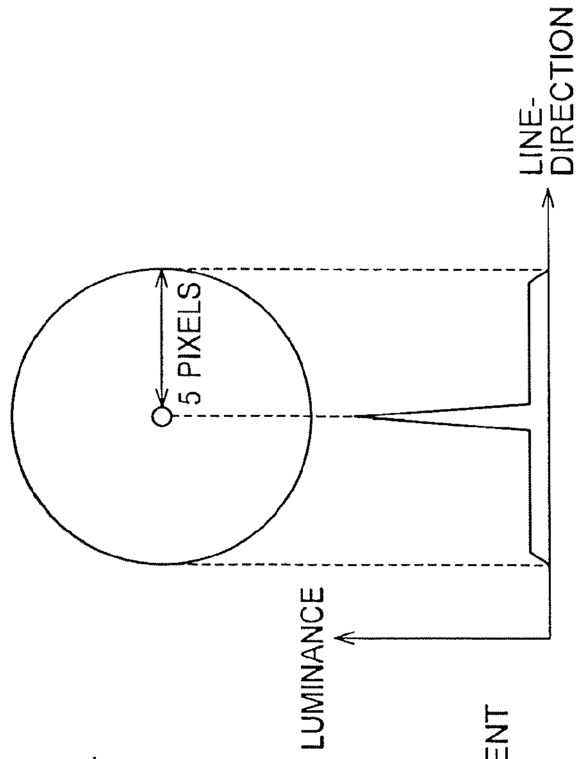
FIGS. 5A and 5B are views for use in illustration of a mechanism of how halation is generated in a region not adjacent to a spacer.
Figure 5A:
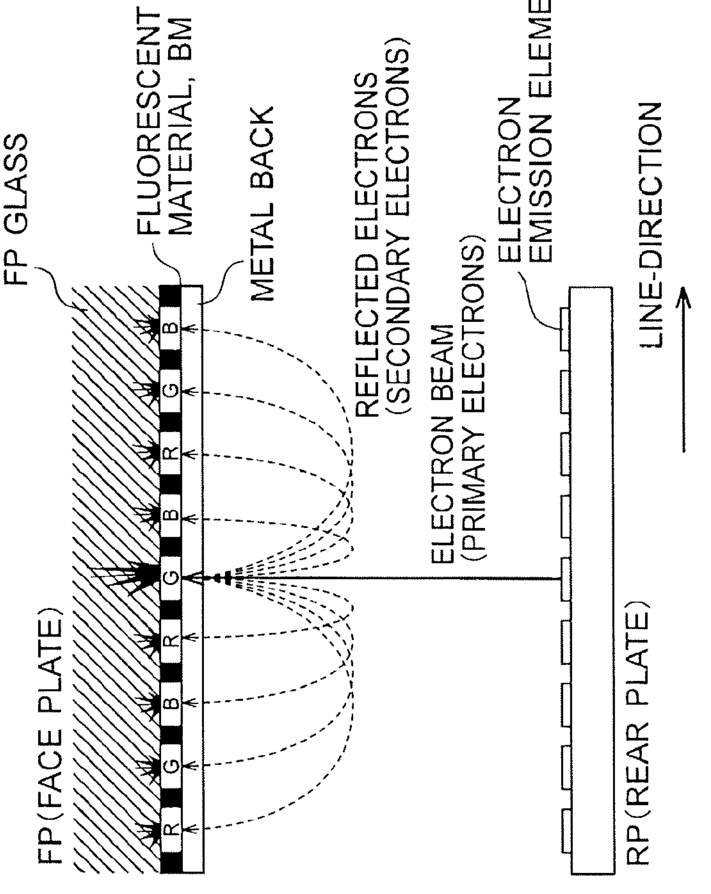

As shown in FIG. 5B, it has been found that in the SED, when a fluorescent material is irradiated with electrons, a circular light emission (distributed in the form of a cylinder around the luminescent spot when the luminance is expressed in terms of light emission amount) is caused by halation around the irradiated pixel. If the radius of the circular region of the halation is n pixels, a 2n+1 tap filter is necessary as a pixel reference range for halation correction processing that will be detailed later.

It has also been confirmed that the radius of the region of the halation is uniquely determined based on the distance between the face plate having the fluorescent materials and the rear plate having the electron source and the pixel size. Therefore, if the distance between the face plate and the rear plate is known, the filter tap number can be determined uniquely. According to the embodiment, since n=5 (pixels), an 11 tap filter is necessary. In other words, as can be understood from FIG. 8, data for the 11 pixels×11 lines must be referred to in order to take into account the degree of effect of the halation.

In this way, the radius of the region of the halation is a static parameter obtained from the physical structure of the panel (such as the distance between the face plate and the rear plate and the pixel size). Therefore, when the same correction circuit is used for different kinds of SED panels, the halation mask pattern in FIG. 8 may be changed as a variable parameter.

Figure 6B:
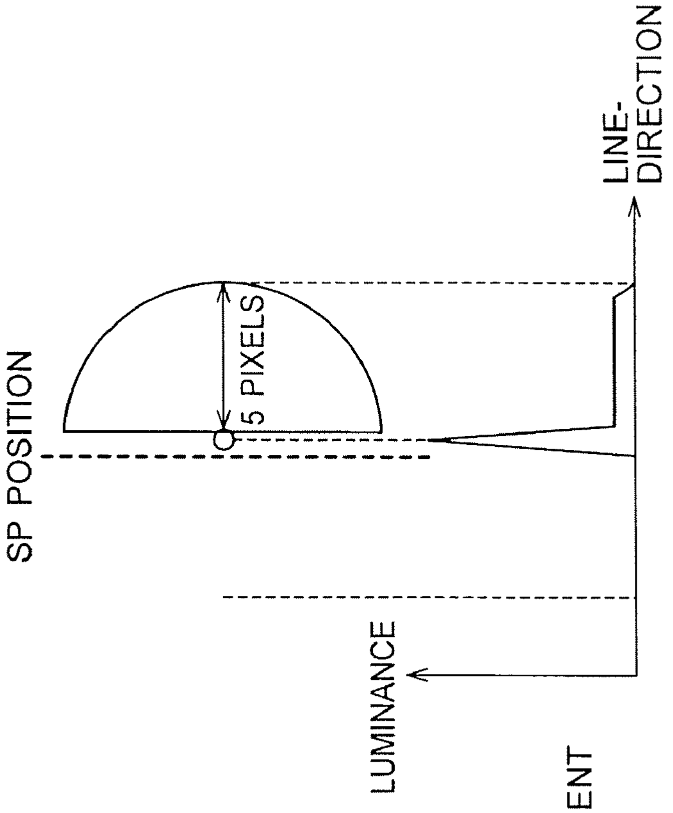
FIGS. 6A and 6B are views for use in illustration of a mechanism of how halation is generated in a region adjacent to a spacer.
Figure 6A:
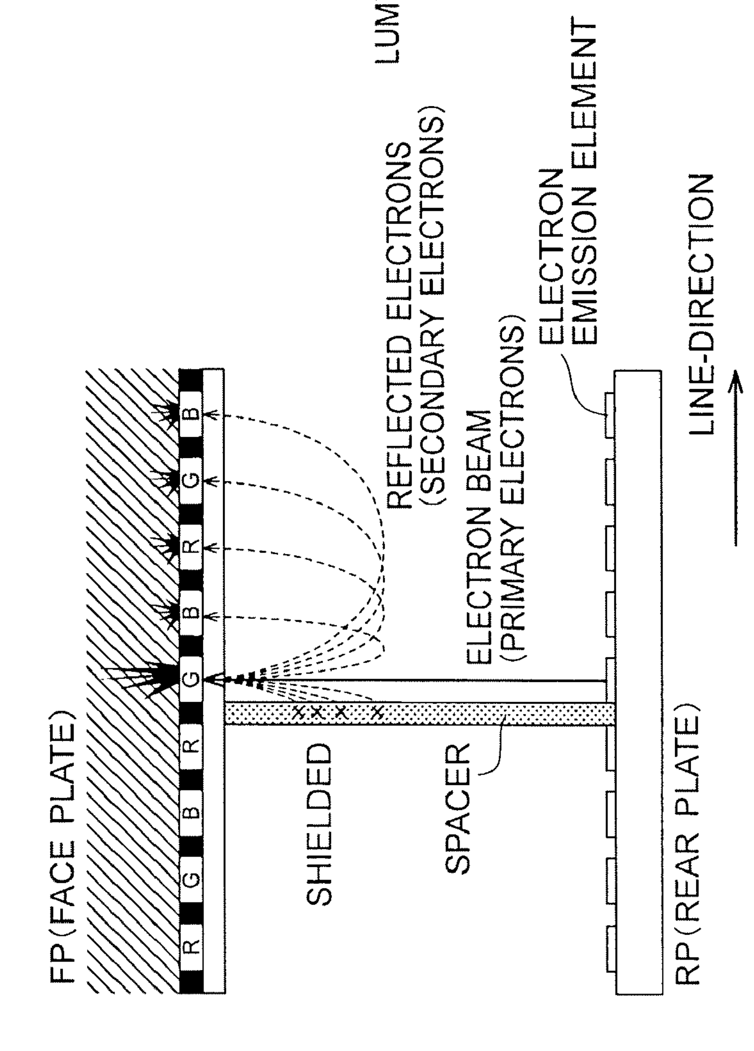

In FIGS. 5A and 5B, a shielding member such as a spacer is not provided in the reflection trajectory of reflected electrons (not adjacent to a spacer). When a shielding member such as a spacer is present (adjacent to a spacer), reflected electrons (secondary electrons) are shielded by the spacer as shown in FIG. 6A, and therefore the halation intensity can be reduced. It has been found that when an electron beam (primary electrons) is discharged from the electron emission element in the most immediate vicinity of the spacer, in the affecting range of the halation, semi-circular shaped light emission is caused as shown in FIG. 6B. Although the fluorescent materials are arranged in turn in the order of R, G, and B (horizontal stripes) in the direction of line in FIGS. 5A and 6A only for the ease of illustration, the materials are actually arranged in turn in the order of R, G, and B in the horizontal direction (vertical stripes).

This is a mechanism of how the halation is caused when the case in which light is emitted from one element is used as an example. In an actual SED, a plurality of elongate spacers extending in the horizontal direction are provided at intervals of several ten lines. When light in the same color is turned on over the entire surface, the amount of halation is different between the regions adjacent and not adjacent to the spacer. It has confirmed that the color purity is different between these regions, i.e., spacer related unevenness is caused, which is a problem unique to the device.

Figure 12A:
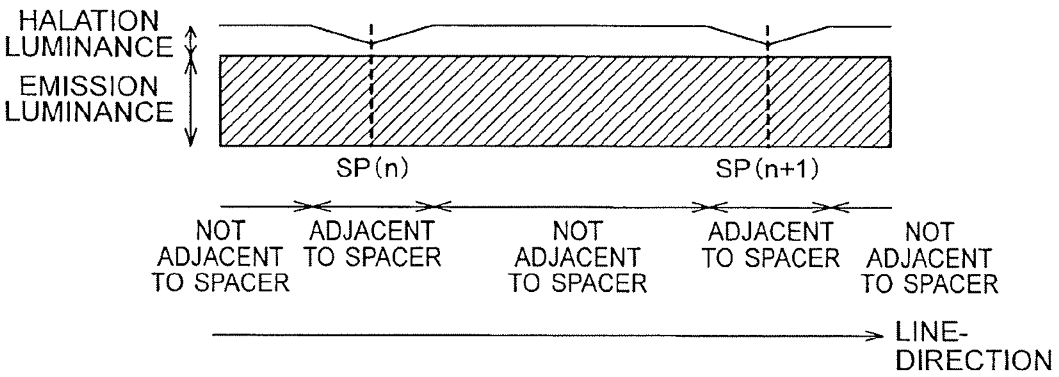
FIGS. 12A and 12B each show an image of how halation correction is carried out by the shielded amount addition method.

The degree of the spacer-related unevenness depends on the lighting pattern in the displayed image, while when blue light is turned on over the entire surface, the halation luminance is added to the light emission luminance of blue, the amount of reflected electrons shielded by the spacer varies step-wise depending on the distance from the spacer in the region adjacent to the spacer as shown in FIG. 12A. Therefore, a step-wise color purity change in a wedge-shape about as wide as 10 lines is visible.

Figure 7:
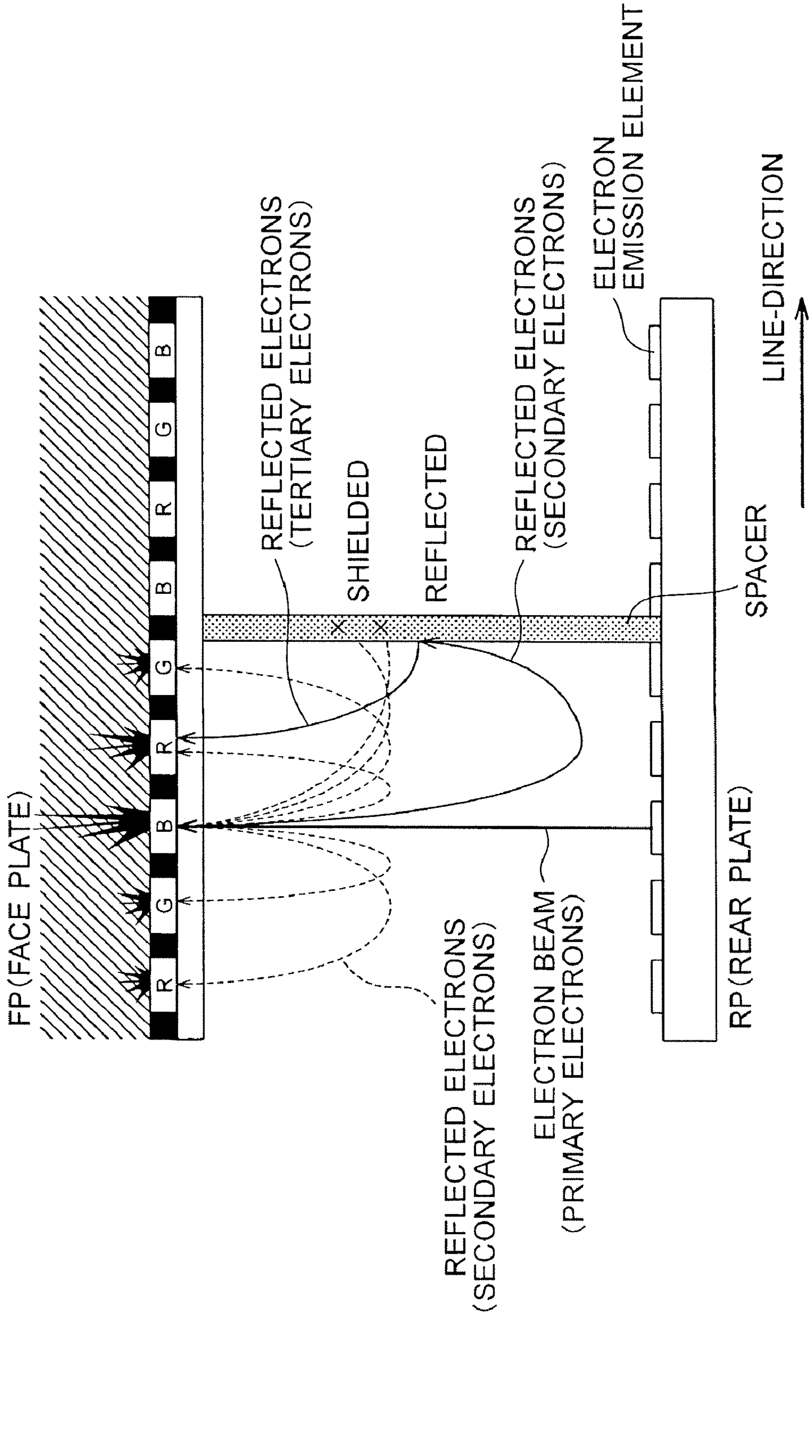
FIG. 7 is a view for use in illustration of a mechanism of how halation is generated when spacer reflection is caused in a region adjacent to a spacer.

After considerable study and research efforts, the inventors have found that not only the shielding of the reflected electrons by the spacer but also re-reflected electrons generated when the reflected electrons coming into the spacer are again reflected by the spacer are a significant cause for the spacer related unevenness. Herein, the reflected electrons include electrons emitted by the secondary electrons generated from electrons coming into the spacer, which will be hereinafter referred to as "tertiary electrons." FIG. 7 shows not only the mechanism of how the re-reflected electrons are shielded in a region adjacent to the spacer shown in FIGS. 6A and 6B, but also the mechanism of how the reflected electrons (secondary electrons) produced as the electron beam (primary electrons) are reflected by a fluorescent material affect fluorescent materials adjacent to the spacer as spacer-reflected electrons (tertiary electrons). Although FIG. 7 shows only one trajectory for the spacer-reflected electrons for the ease of illustration, actual reflection is much more complicated.

According to the embodiment, pixels affected by the spacer-reflected electrons are dominantly in first adjacent pixels above and under the spacer, and second adjacent pixels above and under the spacer. In FIG. 4, the spacer is provided in the direction of the row-interconnection (scanning line) extending in the horizontal direction on the surface of the sheet. The pixel adjacent to the spacer in the upper part of FIG. 4 is the first adjacent pixel above the spacer and the pixel adjacent to the spacer in the lower part of FIG. 4 is the first adjacent pixel under the spacer. Similarly, the pixels adjacent to the spacer next to the first adjacent pixels are the second adjacent pixels above and under the spacer. Therefore, in the following description, the range of the effect of the spacer reflected electrons will be described with reference to the range as far as the second adjacent pixels above and under the spacer. It is understood that the range is not limited to this range, and may change depending on the driving condition of the SED, the material characteristic of the spacer and the like. In FIG. 7, the fluorescent materials are arranged in turn in the order of R, G, and B (horizontal stripes) in the direction of line only for the ease of illustration, but the materials are actually arranged in turn in the order of R, G, and B in the horizontal direction (vertical stripes).

More specifically, it has been found that the spacer (shielding material) tends to shield electrons reflected from peripheral pixels adjacent to a target pixel for emission (a light emitting region) toward the target pixel. It has also been found that the spacer tends to irradiate electrons to the target pixel. This also applies to the plasma display, and a rib for shielding between pixels allows ultraviolet light for transmitting energy to be shielded, and also reflects the ultraviolet light.

According to the invention, the "pixel" may refer to the combination of sub pixels in different colors (such as an R sub pixel, a G sub pixel, and a B sub pixel) as one pixel in a system such as RGB display that carries out color display by generating a plurality of colors. Meanwhile, such sub pixels may each be treated as a single pixel.

After significant efforts, the inventors have considered about these two causes for the spacer-related unevenness, and conceived an image display device having a new structure that can improve the picture quality of the SED. In the following, specific examples of the image display device according to the invention will be described in conjunction with the accompanying drawings.

In FIG. 1, the embodiment includes 11 line memories 1. The original image data is sequentially written in the line memories on a line-basis, and once data for the 11 lines is stored, data for 11 pixels×11 lines is read out at a time for reference used to carry out calculation.

The data for 11 pixels×11 lines around a target pixel thus read out at a time is referred by a spacer shielded amount calculating portion 2 and a spacer reflected amount calculating portion 4 for operation, and the data of the target pixel is transferred to a correction addition portion 8.

Now, the operation of the spacer shielded amount calculating portion 2 will be described. The spacer shielded amount calculating portion 2 selectively adds only the electrons shielded by the spacer among the electrons reflected from the peripheral pixels at the target pixel adjacent to the spacer.

A spacer positional information generating portion 3 determines whether the target pixel is adjacent to the spacer based on a timing control signal received from a timing control portion 23 and an SPD value (Spacer Distance) representing the positional relation between the target pixel and the spacer generated based on the spacer positional information. The SPD value varies depending on the distance between the target pixel and the spacer.

Figure 9:
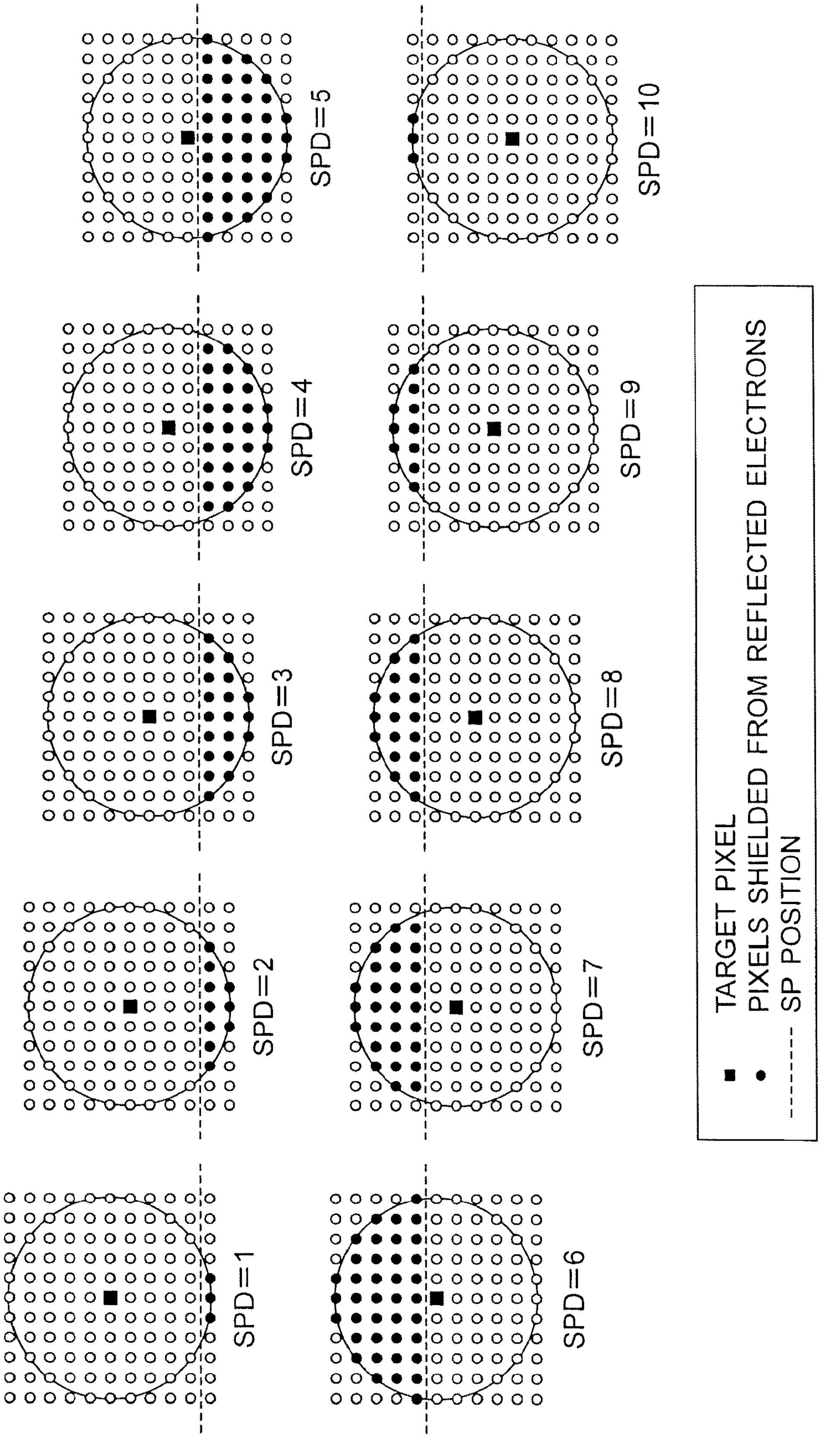
FIG. 9 shows how reflected electrons are shielded in a pixel region depending on the distance between a target pixel and a spacer.

The pixels corresponding to the reflected electrons shielded at the target pixel adjacent to the spacer are in ten patterns depending on the SPD values as shown in FIG. 9, and the total lighting amount related to the shielded amount may be obtained by selecting pixel values represented by dark circles based on the SPD values and adding up all the values.

In a region not adjacent to the spacer, the reflected electrons are not shielded by the spacer, and therefore the addition result may be zero.

A first multiplier 5 multiplies a coefficient representing the percentage of the addition result that corresponds to the shielded halation (spacer shielded amount gain). The coefficient normally takes a value between 0 and 1, and is a value of about 1.5% in an actual panel.

Now, the operation of the spacer reflected amount calculating portion 4 will be described. The spacer reflected amount calculating portion 4 integrates only the tertiary reflected electrons produced as reflected electrons from the peripheral pixels are reflected by the spacer to the target pixel adjacent to the spacer based on the lighting amount of the peripheral pixels.

Figures 10A, 10B:
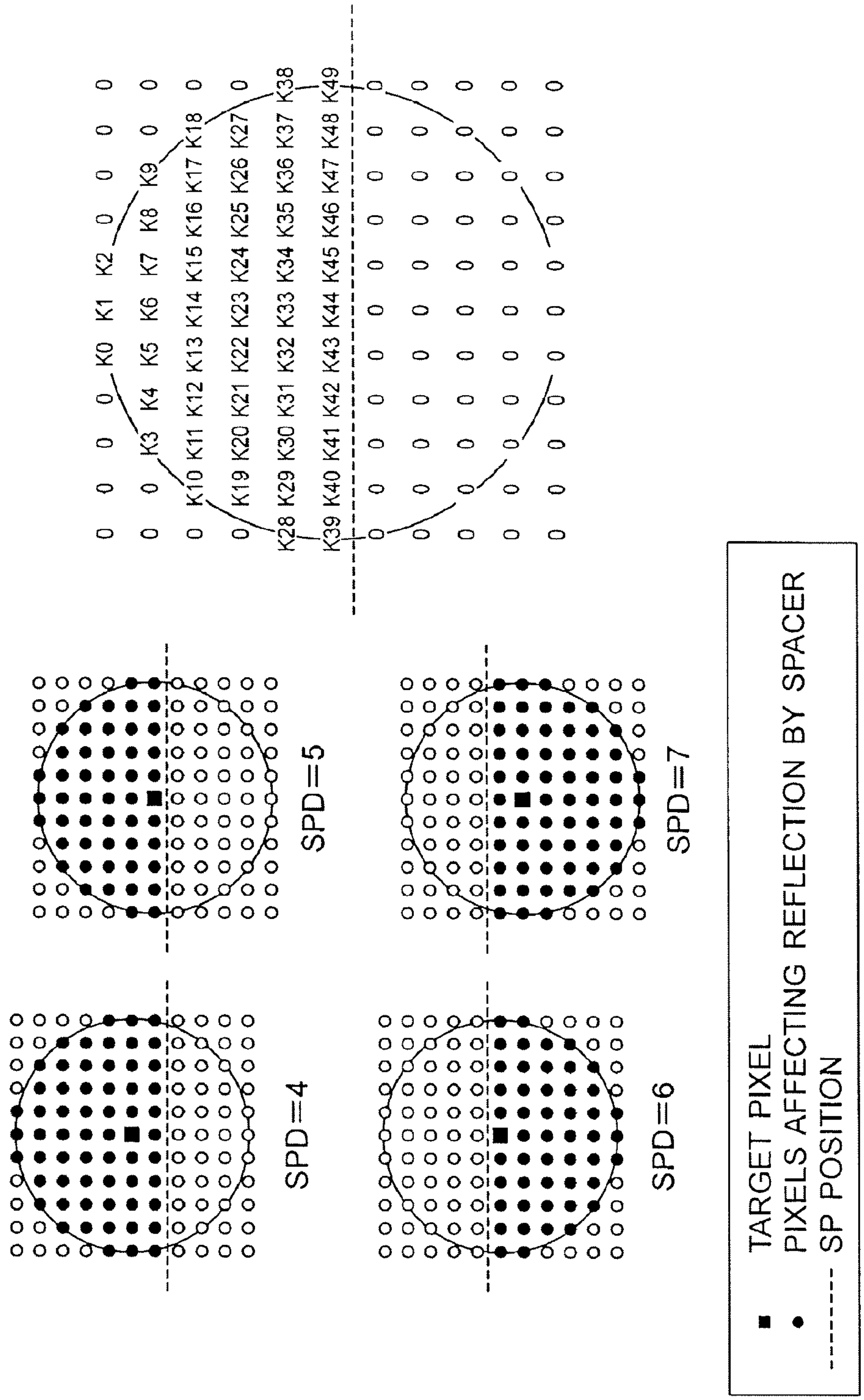
FIGS. 10A and 10B show how electrons reflected by a spacer affect a pixel region depending on the distance between a target pixel and the spacer.

Whether the target pixel is adjacent to the spacer is similarly determined based on the SPD value (Spacer Distance). The pixels affecting the reflection by the spacer at the target pixel adjacent to the spacer are in four patterns based on the SPD values as shown in FIG. 10A. The total lighting amount related to the spacer reflected amount may be obtained by selecting pixel values represented by dark circles based on the SPD values, multiplying the value of each of the selected pixels by a predetermined weighting coefficient that varies based on the pixel value and the position of the pixel, and adding up the results.

Herein, the predetermined weighting coefficient that varies depending on the pixel position is defined by one of 50 values K0 to K49 between 0 and 1 as in FIG. 10B showing the example when SPD=5, and an actual coefficient value is determined based on a parameter such as a difference in the incident angle of reflected electrons to the spacer caused by light emission by a predetermined pixel and a difference in the reflectance caused by the difference.

The region not adjacent to the spacer other than the above four patterns does not affect the spacer reflection, and therefore the addition result is zero.

A second multiplier 6 multiplies a coefficient representing the percentage of the addition result to represent halation caused by the spacer reflection (spacer reflected amount gain). The coefficient is normally a value between 0 and 1, and about 0.2% in an actual panel.

The correction value by the first multiplier 5 is produced as a "correction value for the shielded amount," the correction value by the second multiplier 6 is produced as a "correction value for the spacer reflected amount," and the halation correction value is produced as "halation correction value=correction value for shielded amount−correction value for spacer reflected amount" by a subtracter 7.

Now, the halation correction value is added to the original data by a correction adding portion 8 like "Rout=Rin+halation correction value," "Gout=Gin+halation correction value," and Bout=Bin+halation correction value," so that correction data after the halation correction is obtained.

More specifically, according to the embodiment, the correction value obtained by evaluating the shielded amount by the shielding member is used to carry out correction to increase the image data so that a halation state similar to a region not adjacent to the spacer is simulated in a region adjacent to the spacer serving as the shielding member. Furthermore, since the light quantity of the target pixel increases by electrons reflected by the shielding member or secondary electrons generated by electrons coming into the shielding member (which are referred to as "tertiary electrons" as described above), the data is overcorrected if only the correction value produced by evaluating the shielded amount is used. In view of this, the spacer reflected amount is further corrected. Herein, the correction value for the shielded amount is adjusted with the correction value for the spacer reflected amount. It is understood that the pixel signal (video signal) may be corrected using the correction value for the shielded amount, and then the corrected pixel signal may be corrected with the correction value for the spacer reflected amount. Alternatively, the pixel signal may be corrected with the correction value for the spacer reflected amount and then the corrected signal may be corrected with the correction value for the shielded amount.

Figure 12B:
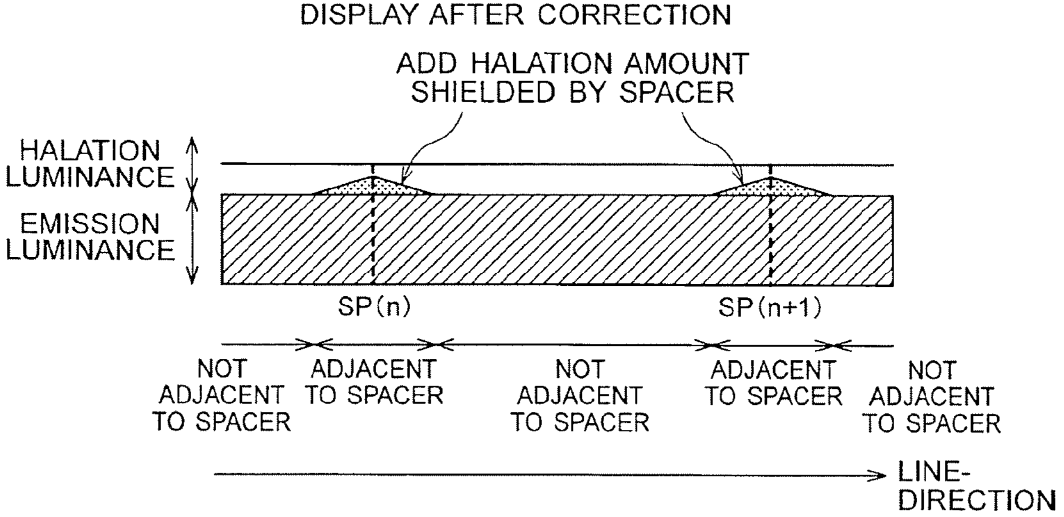

In this way, the compensated halation correction amount is added to the gradual change in the color purity in the region adjacent to the spacer before the correction in FIG. 12A. The compensated halation correction amount is produced by subtracting the spacer reflected amount from the reflected electrons shielded in the region adjacent to the spacer as shown in FIG. 12B. More specifically, the different in the color purity between the regions adjacent and not adjacent to the spacer can be reduced over the screen as a whole and the spacer-related unevenness caused by halation can be corrected.

Second Embodiment

Figure 13A:
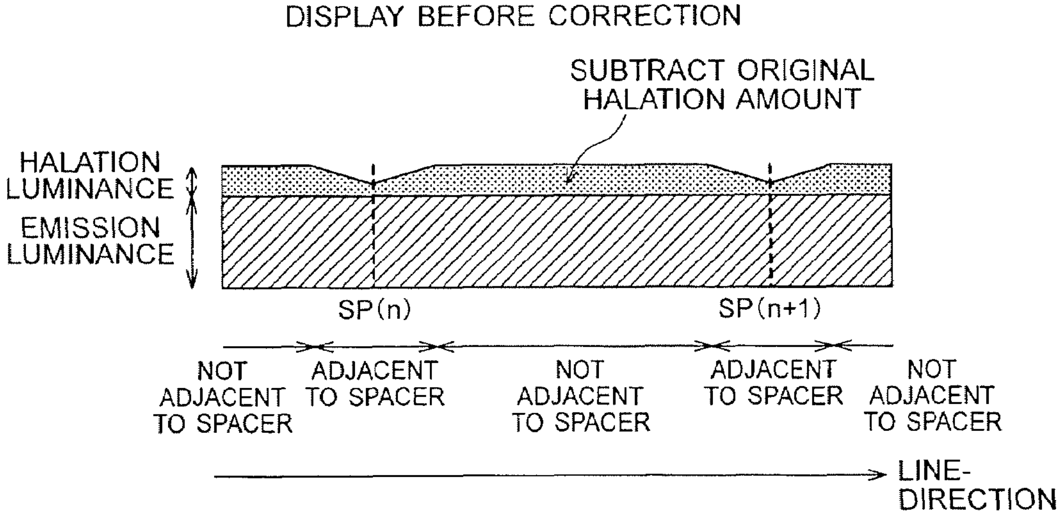
FIGS. 13A and 13B each show an image of how halation correction is carried out by the reflected amount subtraction method.
Figure 13B:
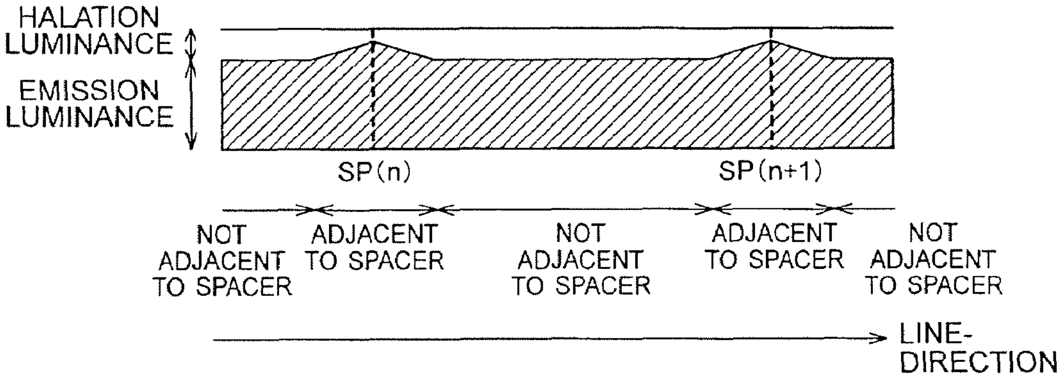

According to the first embodiment, the reflected electrons shielded by the spacer in the region adjacent to the spacer are estimated, and the halation for the shielded amount is added to correct the spacer-related unevenness. According to the second embodiment, as shown in FIG. 13A, the halation amount originally existing in regions adjacent and not adjacent to the spacer are estimated and subtracted from the original image data to correct the spacer-related unevenness as shown in FIG. 13B, so that the spacer reflected amount is compensated for similarly to the first embodiment. The method of correcting the spacer-related unevenness will be described in conjunction with FIG. 2.

Unlike the first embodiment, the spacer shielded amount is not calculated, but the originally existing halation generated by secondary electrons reflected by the fluorescent materials as shown in FIGS. 5A and 5B is calculated by a fluorescent reflected amount calculating portion 9.

Figure 11:
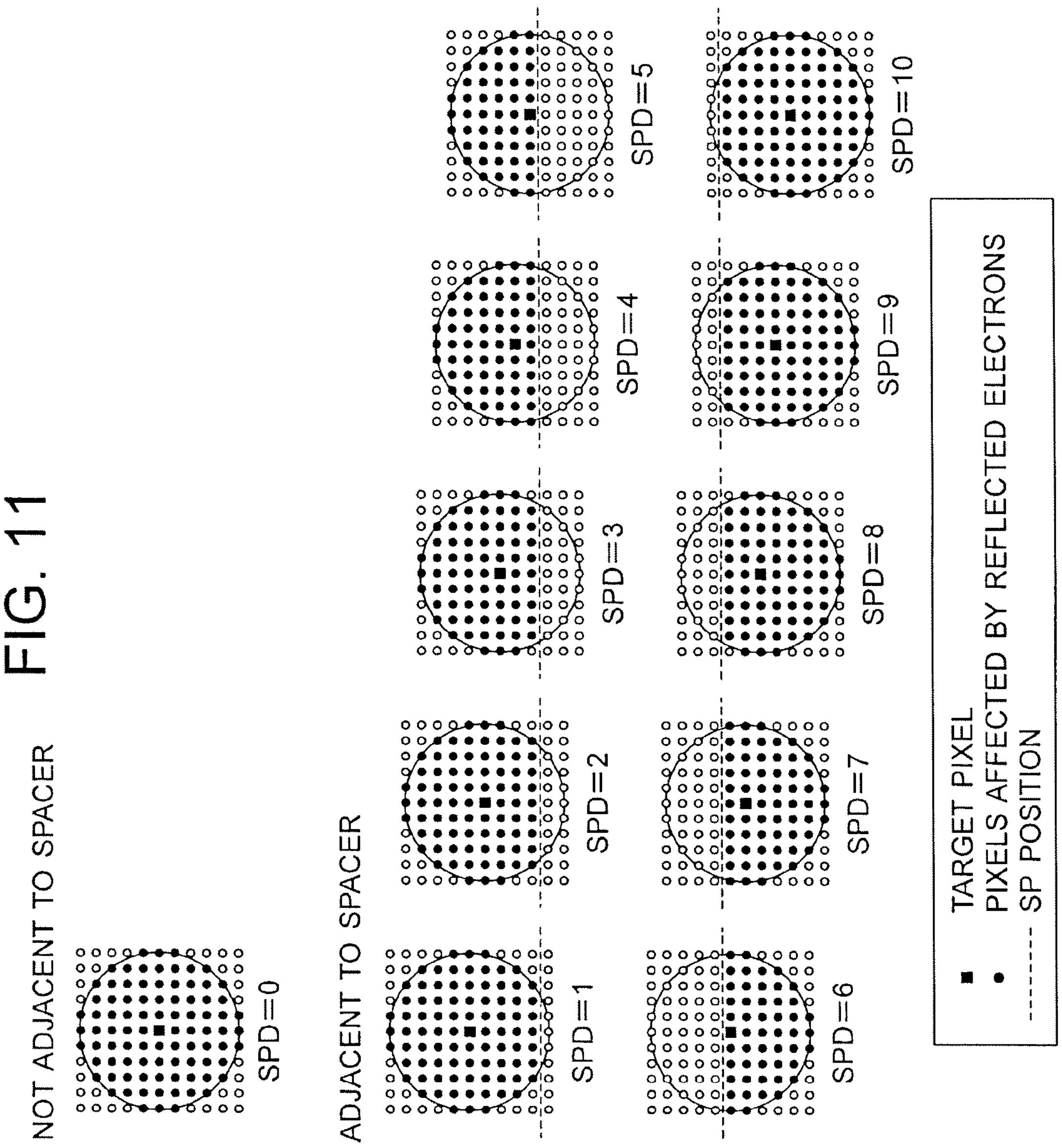
FIG. 11 shows how reflected electrons affect a pixel region depending on the distance between a target pixel and a spacer.

There are 11 patterns for calculating the fluorescent reflected amount according to the SPD values as shown in FIG. 11, and the SPD value is zero in a region not adjacent to the spacer and ranges from 1 to 10 in regions adjacent to the spacer. Pixel values represented by dark circles are all selected based on the SPD values, added up, and multiplied by a fluorescent reflected amount gain (that equals the spacer shielded amount gain) by the first multiplier 5. The correction value for the spacer reflected amount is calculated in the same manner as the first embodiment.

Figure 2:
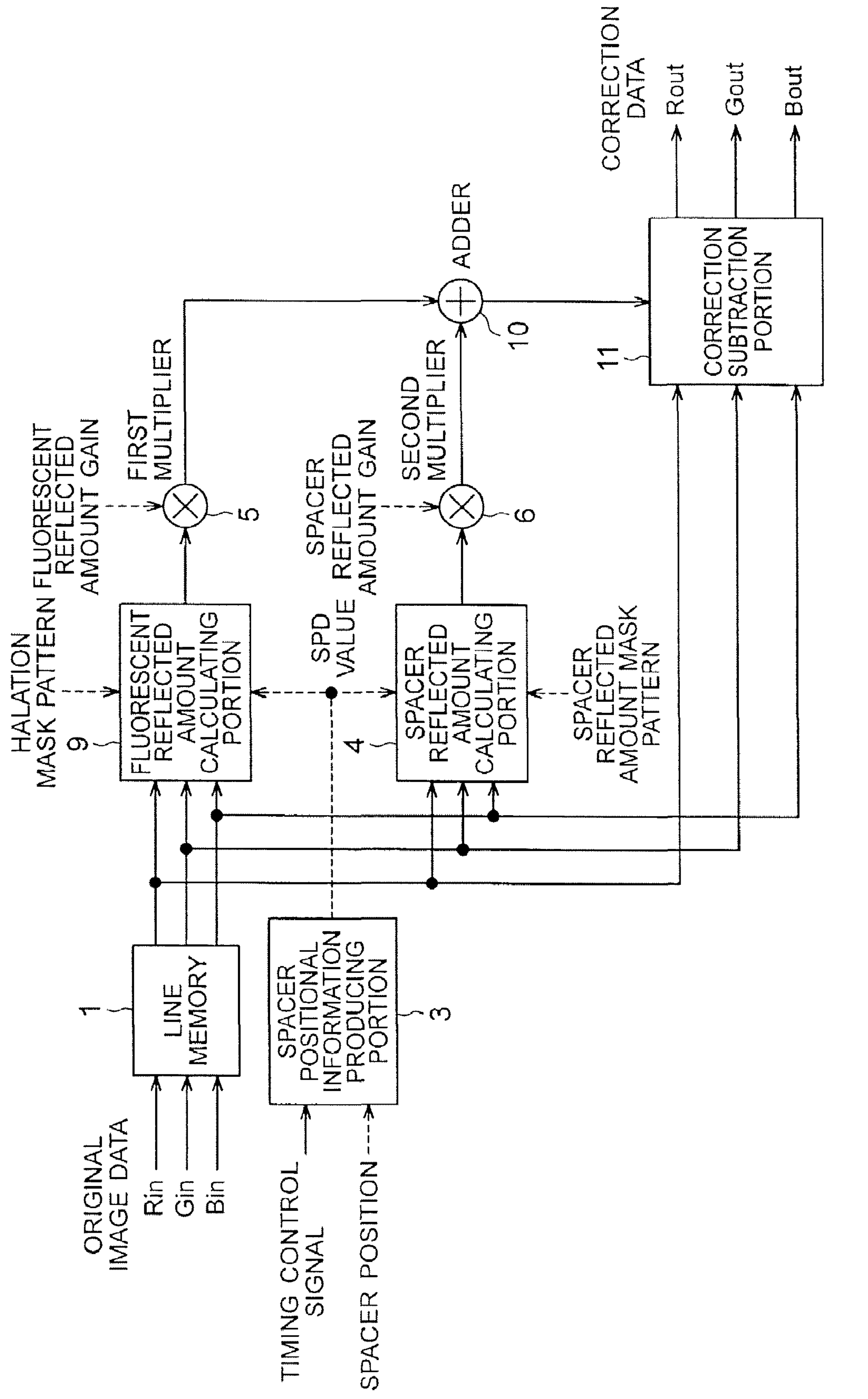
FIG. 2 is a block diagram of a halation correction portion according to a reflected amount subtraction method according to a second embodiment of the invention.

The correction value produced by the first multiplier 5 in FIG. 2 is the "correction value for the fluorescent reflected amount," the correction value produced by the second multiplier 6 is the "correction value for the spacer reflected amount," and the halation correction value is produced by an adder 10 as "halation correction value=correction value for fluorescent reflected amount+correction value for spacer reflected amount."

Now, the halation correction value is subtracted from the original data by a correction subtraction portion 11 like "Rout=Rin−halation correction value," "Gout=Gin−halation correction value," and Bout=Bin−halation correction value," so that correction data after the halation correction is obtained.

More specifically, according to the embodiment, correction is carried out to reduce the light emission quantity of the target pixel in order to compensate for increase in the light emission quantity of the target pixel caused by halation. At the time, in the region adjacent to the spacer, the increase in the light emission quantity caused by halation is relatively small as compared to that in the region not adjacent to the spacer, and therefore the relative difference can be incorporated in the correction amount. More specifically, correction to reduce the increase in the light emission quantity caused by the halation is carried out in the region not adjacent to the spacer. Over correction is caused if in the region adjacent to the spacer, pixel data corresponding to elements in the same peripheral pixel region as the region not adjacent to the spacer (pixels that cause increase in the light emission quantity to the target pixel by the halation) is extracted to obtain a correction amount. Therefore, according to the embodiment, filtering is carried out so that image data corresponding to pixels among the peripheral pixels that do not cause increase in the light quantity at the target pixel by halation by the presence of the spacer is not included in the calculation of the correction value. Increase in the light quantity of the target pixel caused by the presence of the spacer is also corrected.

In this way, before the correction as shown in FIG. 13A, from gradual change in the color purity in regions adjacent to the spacer, the compensated halation correction amount produced by adding the original halation amount by reflection by the fluorescent materials and the spacer reflected amount is subtracted as shown in FIG. 13B. More specifically, the difference in the color purity between the regions adjacent and not adjacent to the spacer can be reduced over the screen as a whole, and the spacer-related unevenness caused by halation can be corrected.

Third Embodiment

According to the first and second embodiments, the effect of spacer reflected electrons can exactly be calculated by the operation that takes into account the lighting state of peripheral pixels, so that the correction error can be reduced as much as possible. However, the multiplication of the pixel value and a weighting coefficient by the spacer reflected amount calculating portion 4 must be carried out to all the selected pixels, which increases the circuit scale.

According to the third embodiment, unlike the above embodiments, the effect of spacer reflected electrons is not calculated by the operation that takes into account the lighting state of peripheral pixels and a method of simplifying the halation correction by the method of adding the shielded amount described in connection with the first embodiment will be described in conjunction with FIG. 3.

An output from a line memory 1 is sent to a correction amount calculating portion 12. The correction amount calculating portion 12 carries out the same processing as that described in connection with the spacer shielded amount calculating portion 2 in FIG. 1. The result is multiplied by a predetermined spacer shielded amount gain by a multiplier 14, so that the correction value for the shielded amount can be calculated.

Figure 14A:
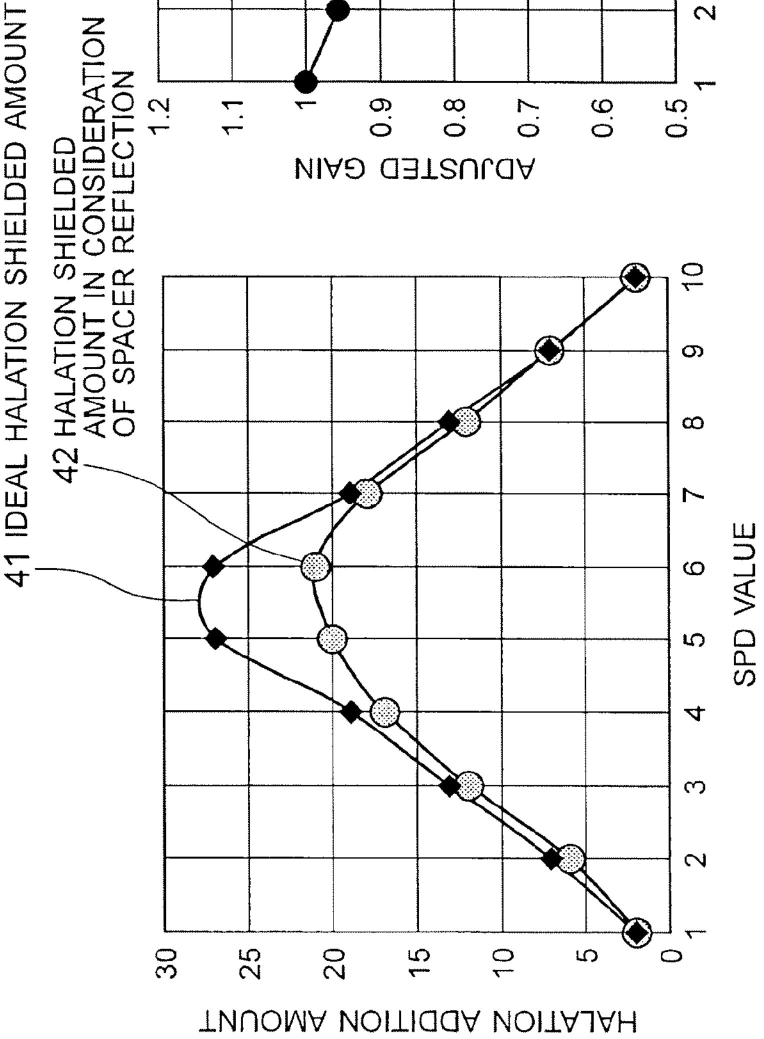
FIGS. 14A and 14B are graphs showing the relation between the SPD value, the halation addition amount, and the adjusted gain.

This corresponds to the graph representing the ideal halation amount 41 in FIG. 14A. However, when the shielded amount is actually measured, the halation amount by spacer reflection is already included, and therefore like the graph representing the halation shielded amount 42 in consideration of the spacer reflection, the measured amount is smaller by the halation amount by the spacer reflection in first proximity (SPD value: 5 and 6) and second proximity (SPD value: 4 and 7) above and under the spacer.

Figure 14B:
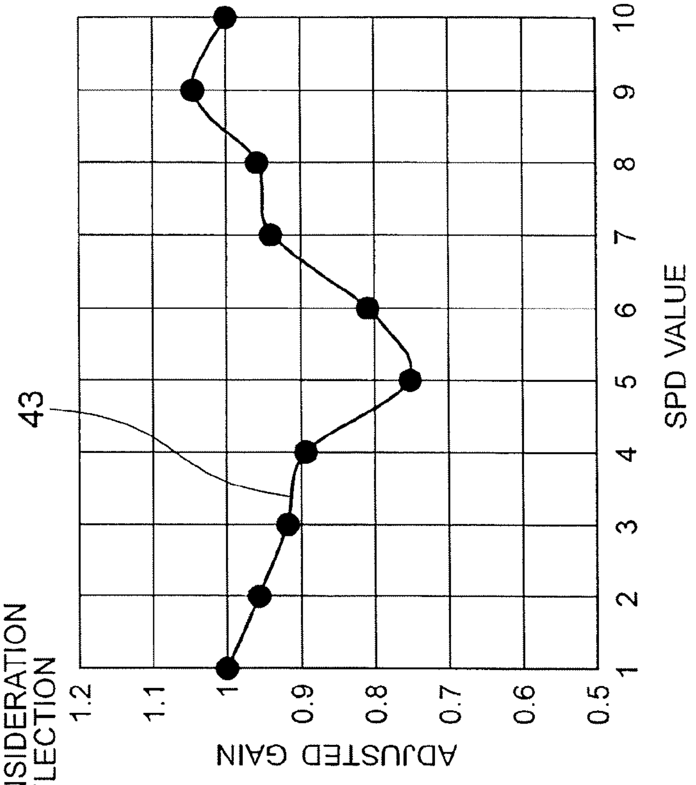

Herein, if "the ratio of actual amount and ideal amount=graph amount 42/graph amount 41" holds, and the gain obtained based on the SPD value is an adjustment gain, as shown by 43 in the graph in FIG. 14B, the relation with a gain of not more than 1.0 that reduces the amount in the first and second proximity above and under the spacer results.

The relation is a parameter including the effect by the spacer reflection, and therefore is referred to as "adjusted profile" in this example. If the adjusted profile is written in the SPD gain table 13 in FIG. 3, the adjusted gain can be changed depending on the SPD value.

In this way, the output of the correction amount calculating portion 12 is multiplied by the adjusted gain by the multiplier 14 and converted into a halation correction value in view of the spacer reflection.

The halation correction value is added to the original image data by a correction operation portion 15 like "Rout=Rin+halation correction value," "Gout=Gin+halation correction value," and "Bout=Bin+halation correction value," so that correction data after the halation correction is obtained.

Strictly speaking, the adjusted profile should change depending on the lighting state of peripheral pixels affecting spacer reflected electrons. This means that the adjusted profile must be variable in response to the lighting state.

Meanwhile, the inventors have found from experiments that spacer-related unevenness is particularly noticeable in images at low spatial frequencies. Therefore, the adjusted profile was produced by measurement for such an image at low spatial frequency such as a single color solid image, and the obtained profile was used to all the other kinds of images. As a result of the experiment, it was confirmed that good correction results were obtained.

Consequently, strangeness to the eye caused by correction errors can be reduced, and a single profile corresponding to the single color solid image with the most noticeable spacer-related unevenness is exclusively used, so that the circuit scale necessary for the correction operation can be reduced.

Fourth Embodiment

According to the fourth embodiment, the method of approximating halation correction in view of spacer reflection described in connection with the third embodiment can be applied to halation correction by the reflected amount subtraction method described in connection with the second embodiment.

Figure 3:
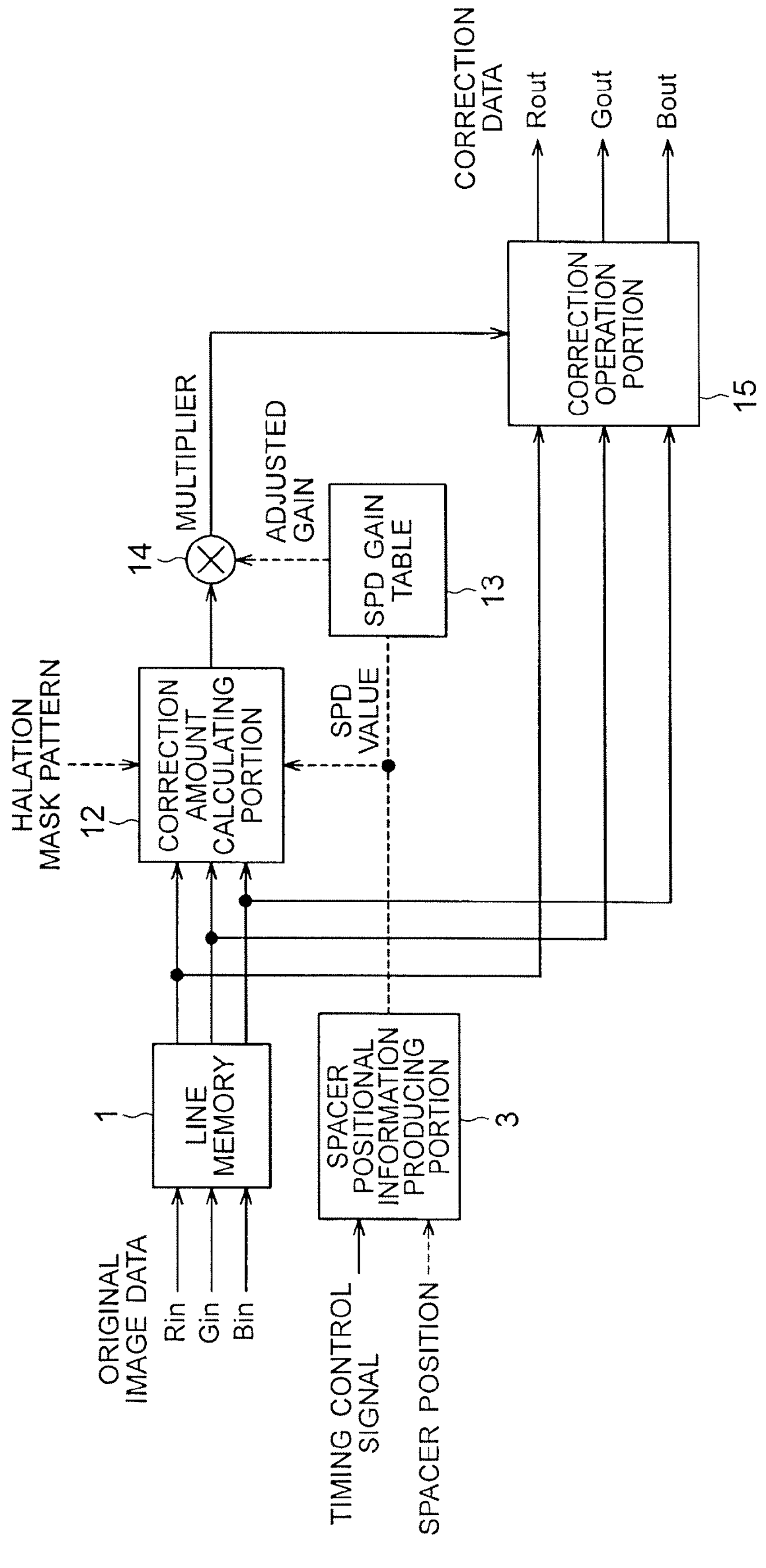
FIG. 3 is a block diagram of a halation correction portion according to an adjusted gain method according to third and fourth embodiments of the invention.

In FIG. 3, an output from a line memory 1 is sent to the correction amount calculating portion 12. The correction amount calculating portion 12 carries out the same processing as that described in connection with the fluorescent reflected amount calculating portion 9 in FIG. 2, and the result is multiplied by a predetermined fluorescent reflected amount gain by the multiplier 14, so that the correction value for the reflected amount can be calculated.

Figure 15A:
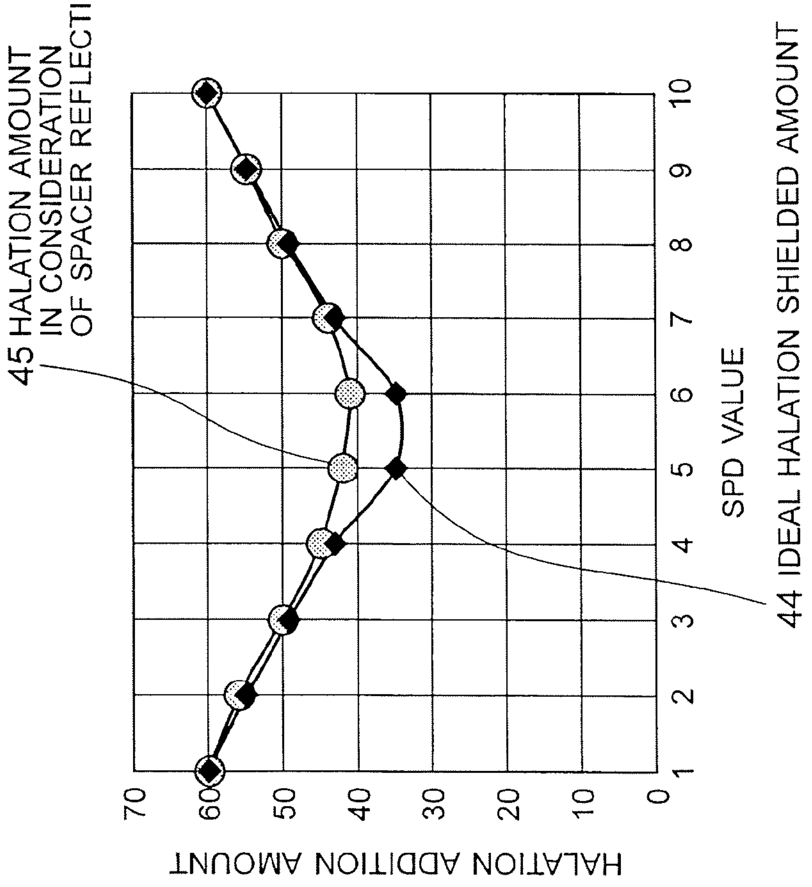
FIGS. 15A and 15B are graphs showing the relation between the SPD value, the halation subtraction amount, and the adjusted gain.

This corresponds to the graph representing the ideal halation amount 44 in FIG. 15A. However, when the original halation amount is actually measured, the halation amount caused by the spacer reflection is already included, and therefore like the graph representing the halation amount 45 in consideration of the spacer reflection, the measured amount is larger by the halation amount by the spacer reflection in first proximity (SPD value: 5 and 6) and second proximity (SPD value: 4 and 7) above and under the spacer.

Figure 15B:
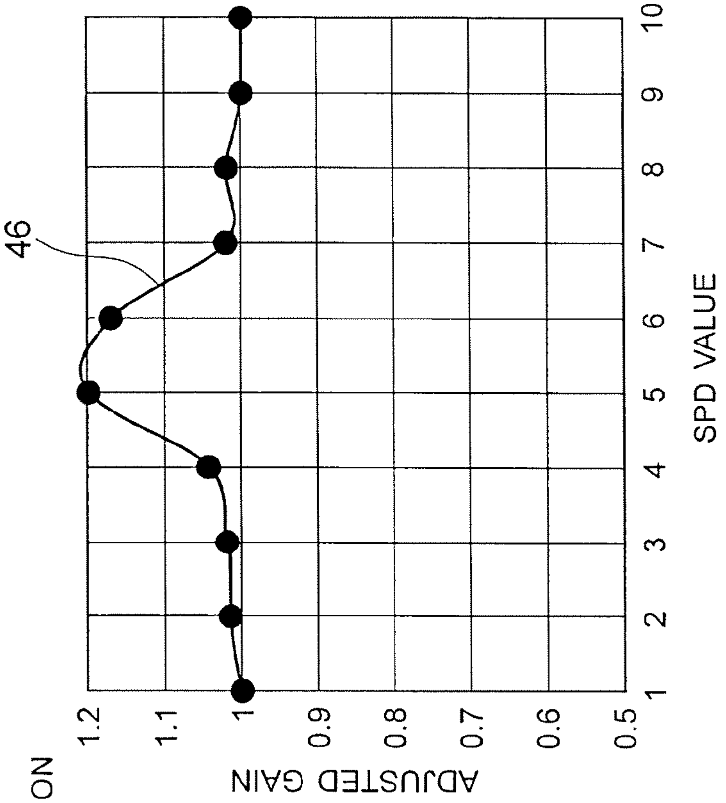

Herein, if "the ratio of actual amount and ideal amount=graph amount 45/graph amount 44" holds, and the gain obtained based on the SPD value is an adjustment gain, as shown by 46 in the graph in FIG. 15B, the relation with a gain of not less than 1.0 that increases the first and second proximity above and under the spacer results.

The relation is a parameter including the effect of spacer reflection, and therefore is referred to as "adjusted profile" in this example. If the adjusted profile is written in the SPD gain table 13 in FIG. 3, the adjusted gain can be variable in response to the SPD value.

In this way, the output of the correction amount calculating portion 12 is multiplied by the adjusted gain by the multiplier 14 and converted into a halation correction value in view of the spacer reflection.

The halation correction value is subtracted from the original data by the correction operation portion 15 like "Rout=Rin−halation correction value," "Gout=Gin−halation correction value," and Bout=Bin−halation correction value," so that correction data after the halation correction is obtained.

Fifth Embodiment

According to the first and third embodiments described above, the shielded amount of reflected electrons shielded in the region adjacent to the spacer is added, and therefore a drop in the chroma caused by halation cannot be corrected. Regarding the reduction in the spacer-related unevenness, a correction error is generated at the brightest part when overflow is caused by the addition, but in normal television video, the region is not used. Therefore, the correction range covers the entire gradation region, and the correction range is wider. According to the second and fourth embodiments, a correction error is generated when underflow is caused by the subtraction at the time of carrying out single color display. However, the halation amount is subtracted both in regions adjacent and not adjacent to the spacer, and therefore the drop in the chroma by halation can be prevented. More specifically, these methods can be employed separately with the same circuit depending upon the conditions, which would improve the correction performance. According to the fifth embodiment, how to handle a plurality of correction methods with the same correction circuit will be described.

The method of calculating the halation correction value (Dh) according to the first embodiment is formulated into an expression.

Figure 8:
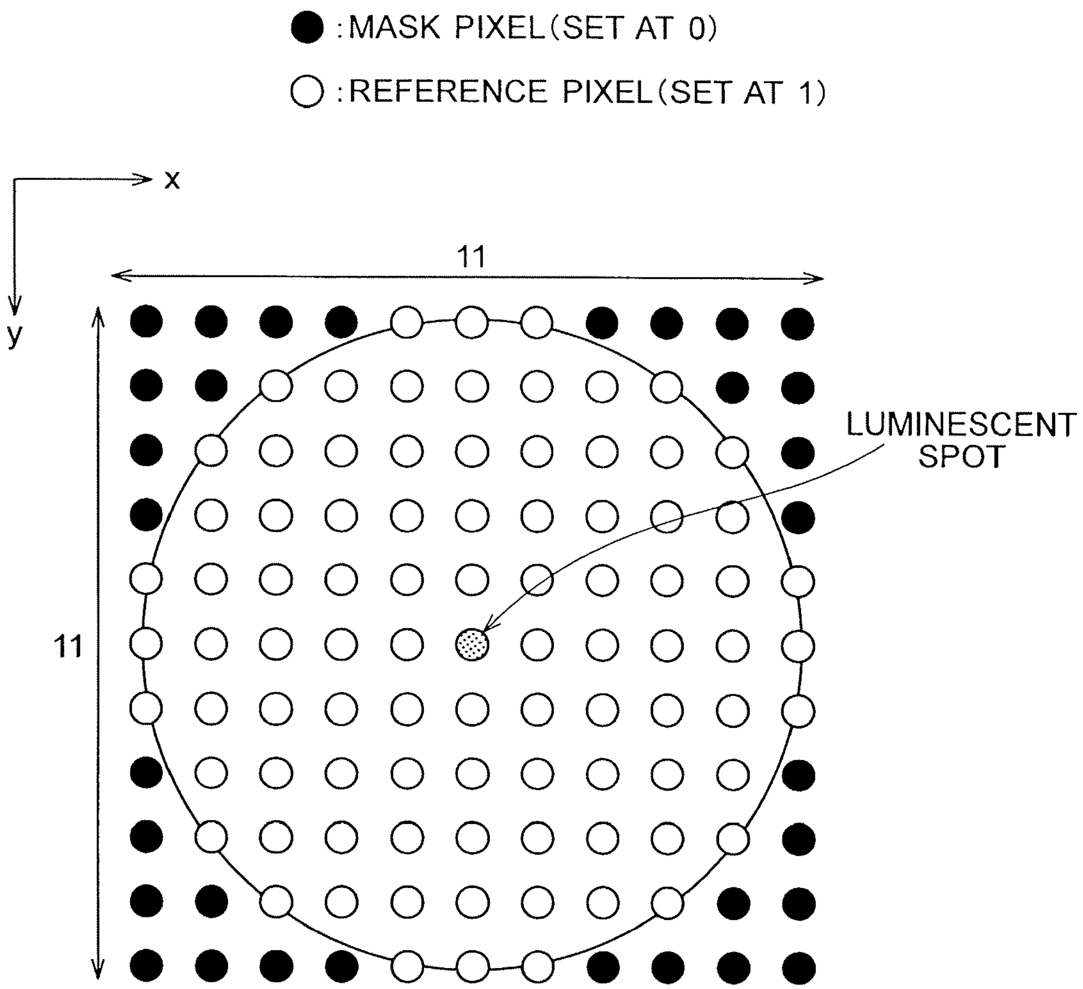
FIG. 8 shows an 11×11 halation mask pattern.

When image data in the halation affecting range in FIG. 8 is $D_{xy}$, the halation shielding mask pattern in FIG. 9 depending on the SPD value is $Mhc_{xy}$, the spacer shielded amount gain is Gc, the spacer reflection mask pattern in FIG. 10 depending on the SPD value is $Mspr_{xy}$, the spacer reflection weighting coefficient is $Kspr_{xy}$, and the spacer reflected gain is Gr, the following expression (1) is established:

$$Dh=Gc^*(\Sigma D_{xy}^*Mhc_{xy})-Gr^*(\Sigma D_{xy}^*Mspr_{xy}^*Kspr_{xy}) \quad (1)$$

Expression (1) can be modified into the following expression (2):

$$Dh = \sum((Gc*Mhc_{xy} - Gr*Mspr_{xy}*Kspr_{xy})*D_{xy}) = \sum(K_{xy}*D_{xy}) \quad (2)$$

where $$K_{xy} = Gc*Mhc_{xy} - Gr*Mspr_{xy}*Kspr_{xy} \quad (3)$$

It can be transformed by a sum-of-product filter into an operation form and $K_{xy}$ is a filter multiplying coefficient and defined by a coefficient calculated according to expression (3) for each of the SPD values.

Similarly, the method of calculating the halation correction value (Dh) according to the second embodiment is formulated into an expression.

When the halation reflection mask pattern in FIG. 11 depending on the SPD value is $Mhr_{xy}$, the fluorescent reflected amount gain is Gc that equals the spacer shielded amount gain, the following expression (4) is established:

$$Dh=-Gc*(\Sigma D_{xy}*Mhr_{xy})-Gr*(\Sigma D_{xy}*Mspr_{xy}*Kspr_{xy}) \quad (4)$$

Expression (4) can be modified into the following expression (5):

$$Dh = \sum((-Gc*Mhr_{xy} - Gr*Mspr_{xy}*Kspr_{xy})*D_{xy}) = \sum(K_{xy}*D_{xy}) \quad (5)$$

where $$K_{xy} = -Gc*Mhr_{xy} - Gr*Mspr_{xy}*Kspr_{xy} \quad (6)$$

It can be transformed by a sum-of-product filter into an operation form. Then, $K_{xy}$ is a filter multiplying coefficient and defined by a coefficient calculated according to expression (6) for each of the SPD values.

Similarly, the method of calculating the halation correction value (Dh) according to the third embodiment is formulated into an expression.

When the adjusted gain corresponding to the SPD value is Gadj, the following expression (7) is established:

$$Dh=Gadj*(\Sigma D_{xy}*Mhc_{xy}) \quad (7)$$

Expression (7) can be modified into following expression (8):

$$Dh = \sum(Gadj*Mhc_{xy}*D_{xy}) = \sum(K_{xy}*D_{xy}) \quad (8)$$

where $$K_{xy} = Gadj*Mhc_{xy} \quad (9)$$

It can be transformed by a sum-of-product filter into an operation form. Then, $K_{xy}$ is a filter multiplying coefficient and defined by a coefficient calculated according to expression (9) for each of the SPD values.

Similarly, the method of calculating the halation correction value (Dh) according to the fourth embodiment is formulated into an expression.

When the adjusted gain corresponding to the SPD value is Gadj, the following expression (10) is established:

$$Dh=-Gadj*(\Sigma D_{xy}*Mhr_{xy}) \quad (10)$$

Expression (10) can be transformed into the following expression (11):

$$Dh = \sum(-Gadj*Mhr_{xy}*D_{xy}) = \sum(K_{xy}*D_{xy}) \quad (11)$$

where $$K_{xy} = -Gadj*Mhr_{xy} \quad (12)$$

It can be transformed by a sum-of-product filter into an operation form. Then, $K_{xy}$ is a filter multiplying coefficient and defined by a coefficient calculated according to expression (12) for each of the SPD values.

Figure 16A:
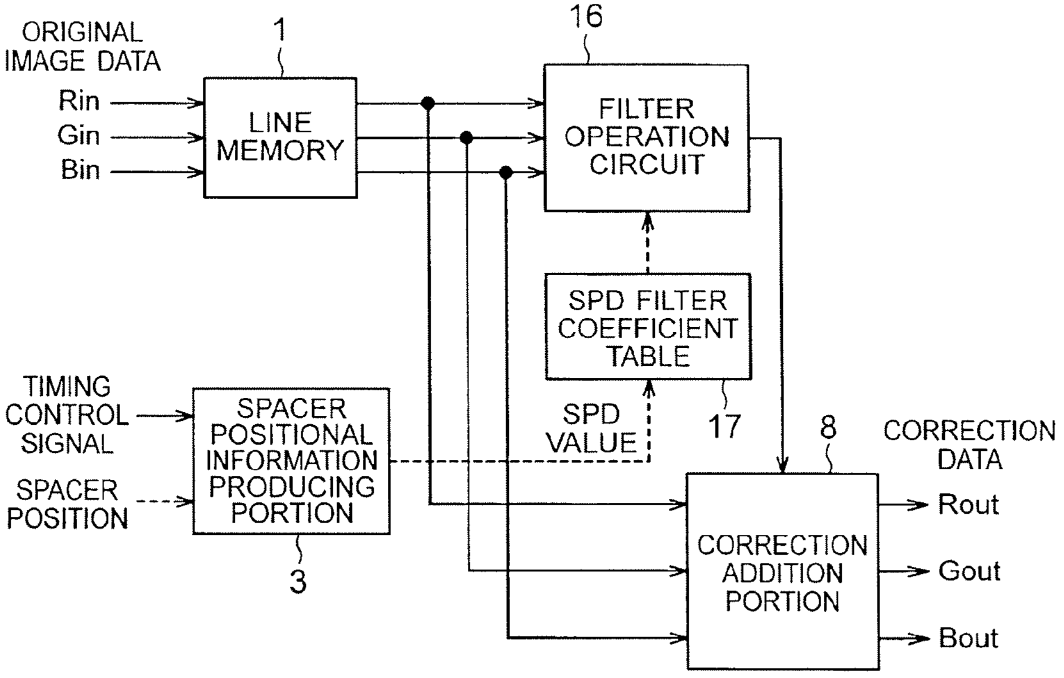
FIG. 16A is a block diagram of a halation correction portion according to a filter operation method according to a fifth embodiment of the invention.
Figure 16B:
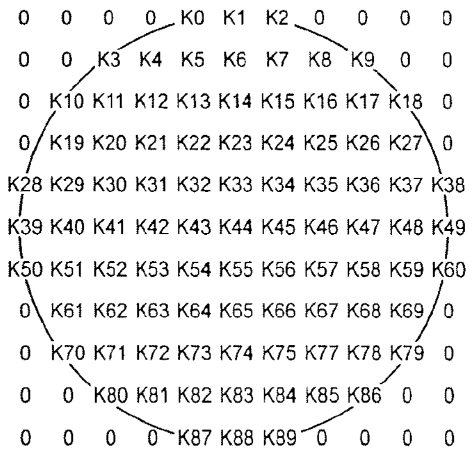
FIG. 16B shows a pattern of multiplying coefficients Kxy from K0 to K89.

As in the foregoing, as shown in the block diagram in FIG. 16A, the filter operation circuit 16 capable of sum-of-product operation is prepared, and the correction method can be switched to the method to implement a multiplying coefficient $K_{xy}$ from K0 to K89 for the entire halation affecting range as shown in FIG. 16B (for example by applying expressions (3), (6), (9), and (12) to the first to fourth embodiments, respectively), so that any kind of halation correction can be carried out by the common filter operation circuit 16.

The multiplying coefficient $K_{xy}$ used by the filter operation circuit 16 may be written in an SPD filter coefficient table 17. As can clearly be understood, the correction method can readily be changed by re-writing the content of the table. The correction circuit according to the embodiment may be implemented only by logic but if the circuit scale increases by a multiplying circuit, a CPU, a DSP, or a media processor capable of parallel operation may preferably be used. The multiplying coefficient $K_{xy}$ may be stored in a ROM or may be transferred from the outside through a peripheral input/output interface.

This application claims priority from Japanese Patent Applications No. 2004-191825 filed Jun. 29, 2004, and No. 2005-166897 filed Jun. 7, 2005, which are hereby incorporated by reference herein.

What is claimed is:

1. An image display apparatus comprising:

a plurality of electron emission elements;

a plurality of fluorescent materials for emitting light by electrons emitted from the electron emission elements;

a spacer for keeping a space between the electron emission elements and the fluorescent materials; and a correction circuit for calculating a halation correction value, which circuit comprises (a) a spacer shielded amount calculating portion for adding electrons shielded by the spacer, and (b) a spacer reflected amount calculating portion for adding electrons reflected by the spacer, wherein the halation coffection value is calculated by subtracting (a) a product of an output value of the spacer reflected amount calculating portion and a spacer reflected amount gain from (b) a product of an output value of the spacer shielded amount calculating portion and a spacer shielded amount gain.

* * * * *